United States Patent
Orr

[11] Patent Number: 5,291,533
[45] Date of Patent: Mar. 1, 1994

[54] COOLING WATER DISTRIBUTION SYSTEM
[75] Inventor: Richard Orr, Pittsburgh, Pa.
[73] Assignee: Westinghouse Electric Corp., Pittsburgh, Pa.
[21] Appl. No.: 34,985
[22] Filed: Mar. 22, 1993
[51] Int. Cl.[5] .................... G21C 15/18; G21C 13/00
[52] U.S. Cl. ................................. 376/299; 239/193
[58] Field of Search .................. 376/299, 298, 293; 239/193, 194; 137/561 A; 261/114.1, 114.5

[56] References Cited

U.S. PATENT DOCUMENTS

| | | | |
|---|---|---|---|
| 3,491,792 | 1/1970 | Eckert | 239/193 |
| 4,432,913 | 2/1984 | Harper et al. | 239/193 |
| 4,881,280 | 11/1989 | Lesikar | 239/193 |
| 5,049,353 | 9/1991 | Conway et al. | 376/299 |
| 5,154,353 | 10/1992 | Plachy | 239/193 |
| 5,169,596 | 12/1992 | Orr | 376/299 |

OTHER PUBLICATIONS

"Status of the AP600 Pressurized Water Reactor" Howard J. Bruschi and T. S. Anderson.

Proceedings of the American Power Conference 37711.APC Apr., 1992.
"AP600 offers a simpler way to greater safety, operability and maintainability" Ronald Vijuk and Howard Bruschi.
Nuclear Engineering International Nov., 1988.

Primary Examiner—Daniel D. Wasil
Attorney, Agent, or Firm—J. C. Valentine

[57] ABSTRACT

A passive containment cooling system for a nuclear reactor containment vessel. Disclosed is a cooling water distribution system for introducing cooling water by gravity uniformly over the outer surface of a steel containment vessel using an interconnected series of radial guide elements, a plurality of circumferential collector elements and collector boxes to collect and feed the cooling water into distribution channels extending along the curved surface of the steel containment vessel. The cooling water is uniformly distributed over the curved surface by a plurality of weirs in the distribution channels.

9 Claims, 4 Drawing Sheets

COOLING WATER DISTRIBUTION SYSTEM

BACKGROUND OF THE INVENTION

This invention was made during the performance of Contract No. DE-AC03-90SF18495 with the United States Department of Energy by Westinghouse Electric Corporation, Pittsburgh, Pa.

This invention relates to nuclear reactors and more particularly to a passive cooling system for the steel containment vessel used to house the nuclear reactor, the steam generators and associated equipment. In U.S. Pat. No. 5,049,353 issued Sep. 17, 1991 to Westinghouse Electric Corporation, there is described a passive containment cooling system used to cool the steel containment vessel of a nuclear power plant in the event of a failure of any of the active cooling systems used in the water cooled reactor. The cooling system described in this patent can also be used as a passive heat sink to remove all core decay heat from the steel containment vessel safely and rapidly and prevent any excessive pressure build-up within the steel containment vessel.

As further described in the above-mentioned U.S. Pat. No. 5,049,353, the passive containment cooling system uses a combination of natural air circulation between the steel containment vessel and the concrete shield building and gravity fed cooling water to provide the necessary cooling and heat sink. In the event of a failure of any of the primary active reactor cooling systems or an accident, the passive containment cooling system can be utilized to provide sufficient cooling to allow for a safe and orderly shutdown of the reactor.

The gravity fed cooling water used in this passive containment cooling system is derived from a large (400,000) gallon annular tank built into the roof of the concrete shield building that encloses the steel containment vessel and when needed, the water is allowed to flow by gravity all over the outside surfaces of the steel containment shell. Because the water is drained by the natural force of gravity, pumps and human operator actions are not necessary to provide the necessary cooling effect. The cooling water storage tank is designed to provide the cooling water requirement for several days after which additional water could be added to the tank or, as most likely, the air cooling provided would be sufficient to remove any residual heat from the steel containment vessel.

In order to provide the most efficient heat removal from the outside surface of the steel containment vessel, it is important that the passive cooling water flows over the entire surface in a thin uniform film to prevent any hot spots occurring on the surface and to maximize the cooling effect of the water. Even, uniform distribution of water over the surface of the steel containment vessel has been difficult due to the fact that the dome of the steel containment vessel is an ellipsoidal dome with a curved surface and the steel surface, while as smooth as steel fabrication practices permit, still contains a number of surface deviations and roughened areas that cause the cooling water to "channel" or otherwise not flow over the surface in a thin uniform film. These surface deviations and variations are large compared to the thickness of the desired water film. It has also been observed that if "channeling" occurs near the top of the steel containment vessel, the channel will continue on down the side of the vessel and thereby create a large area that will not be effectively cooled and lead to hot spots.

Prior attempts to provide for a uniform film of cooling water on the curved surface of the steel containment vessel have improved, but not completely solved the problem. As described in the above-mentioned U.S. Pat. No. 5,049,353, one approach to the problem was to coat the outside surface of the steel containment vessel with a special heat conductive wettable zinc-based paint. While this paint improved the flow of the cooling water as compared to a bare steel surface, channeling and hot spots still occurred.

SUMMARY OF THE INVENTION

It is therefore an object of this invention to provide a cooling water distribution system suitable for use in the passive cooling of the outside of a steel containment vessel that provides a thin, uniform film of cooling water over the entire surface of the steel containment vessel.

It is a further object of this invention to provide a cooling water distribution system that is reliable and provides a maximum cooling effect from a given volume of cooling water.

It is a still further object of this invention to provide a cooling water distribution system that is simple, easily adapted to different sizes and shapes of a steel containment vessel adjustable to accommodate manufacturing or fabricating variations in the surface of the steel containment vessel.

Other and further objects of this invention will become apparent from the following detailed description and the accompanying drawings and claims.

It has been discovered that the foregoing objects can be attained by providing a plurality of guide elements secured to the curved surface of the dome of the steel containment vessel which extend radially outwardly and downwardly from a source of cooling water stored above the dome and a plurality of circumferential collector elements also secured to the curved surface and intersecting the radial guide elements. A collector box is positioned between a pair of adjacent radial guide elements and a pair of adjacent circumferential collector elements. A plurality of distribution channels are secured to the curved surface of the steel containment vessel and extend along and on either side of each collector box. At least one sidewall of each of the distribution channels is provided with a plurality of weirs to uniformly distribute the cooling water flowing in the distribution channels onto the curved outer surface of the steel containment vessel.

DESCRIPTION OF THE PREFERRED EMBODIMENT

Figure 1:
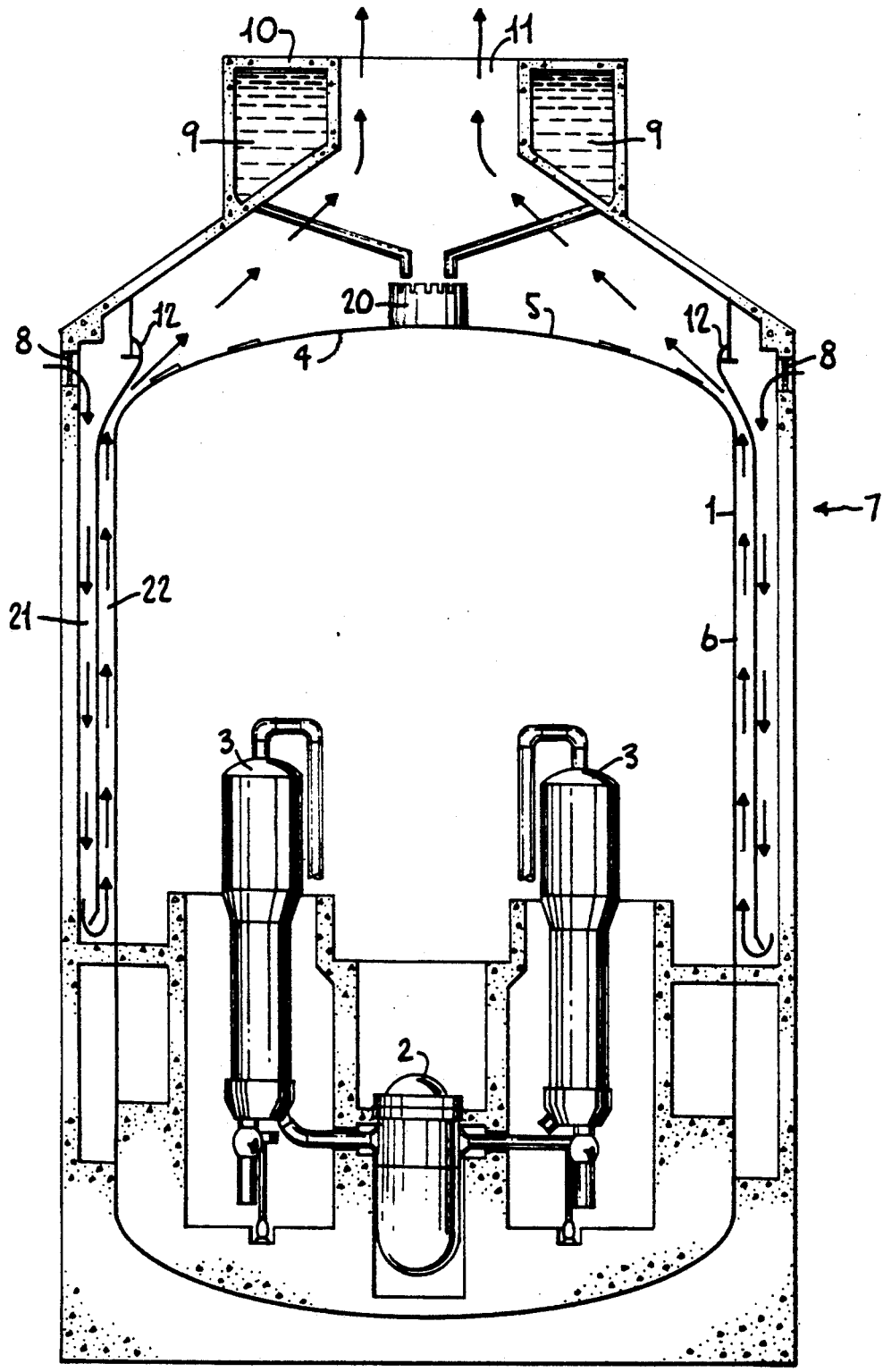
FIG. 1 is a side elevational view, partly in section, of the passive containment cooling system for a nuclear reactor power station for which the cooling water distribution system of this invention was developed.

The passive containment cooling system used in conjunction with the present invention is illustrated in FIG. 1 and is used to remove heat from a steel reactor containment vessel to the outside environment so that the containment vessel design pressure and temperature are not exceeded in the event of a problem or failure of one or more of the primary reactor cooling systems.

As shown in FIG. 1, the passive containment cooling system includes a steel containment vessel 1 which encases a nuclear reactor 2 and steam generators 3. The steel containment vessel 1 has a spherical or ellipsoidal dome top 4 and an outer surface 5 and a cylindrical sidewall 6. For a typical nuclear reactor power plant producing about 1800 megawatts thermal and using a pressurized water nuclear reactor 2, the cylindrical sidewall 6 of the steel containment vessel may have a diameter of about 130 feet (40 meters) and a steel wall thickness of about 1.625 inches (4.13 centimeters) to withstand the required internal pressures.

A concrete shield building 7 surrounds the steel containment vessel 1 with about a 4.4 foot (134.2 centimeters) annular spacing between the outside surface 5 of the steel containment vessel 1 and the inner surface of the shield building 7. The shield building 7 is provided with an air inlet 8 at the top and radially around the shield building 7. The air inlet 8 preferably consists of a series of equally spaced inlet openings provided with louvers.

A source of cooling water 9 is supported in the upper portion of the shield building 7 in an annular tank.

The top 10 of the shield building 7 has a central chimney 11 extending upwardly from the top 10 and provides an exhaust for the heated air and water vapor. The chimney 11 serves to increase the height of the heated air and thereby provides a higher natural circulation of air within the shield building 7. The chimney also prevents the heated air and water vapor from being drawn into the air inlet 8. In one embodiment, the chimney is about 50 feet (15 meters) above the top 10 of the shield building, or about 65 feet (19.5 meters) above the top of the steel containment vessel 1.

A steel air baffle 12 is placed between the inner wall surface of the shield building 7 and the outer wall surface 5 of the steel containment vessel 1 to define a pair of annular air spaces 21 and 22 between the steel containment vessel 1 and the shield building 7 and provide for an effective and efficient flow of air to assist in the cooling of the containment vessel 1. As illustrated in FIG. 1 by arrows, outside ambient air is drawn in to the shield building 7 through the air inlets 8 and flows downwardly through the outer annular space 21 and then upwardly through the inner annular space 22 while passing over the outer surface 5 of the steel containment vessel 1 before it is discharged out through the central chimney 11.

Containment cooling by this generated natural draft of outside cooling air may be insufficient in the event of a temporary failure or problem with one of the primary cooling systems inside the reactor 2. Therefore, the present invention is directed to supplemental water cooling system that supplies cooling water to the outer surface 5 of the steel containment vessel 1 from a gravity source of cooling water 9 located in the top 10 of the shield building 7. The cooling water will initially cool the outer surface 5 by direct conductive heat transfer. As the cooling water heats up, it begins to evaporate into the upwardly flowing stream of cooling air. This creates an evaporative cooling action which will cool the outer surface 5 of the steel containment vessel 1 well below the normal boiling point of water at the expected moderate heat fluxes. This is a result of the cooling air being able to diffuse onto the surface 5 and thereby lowering the partial pressure of the water vapor coming off the surface 5 and thereby lowering the saturation temperature of the heated cooling water.

The release of cooling water from the source of cooling water 9 in the top of the shield building 10 is intended to provide cooling capability for several days, after which it is expected the water supply could be replenished.

Figure 2:
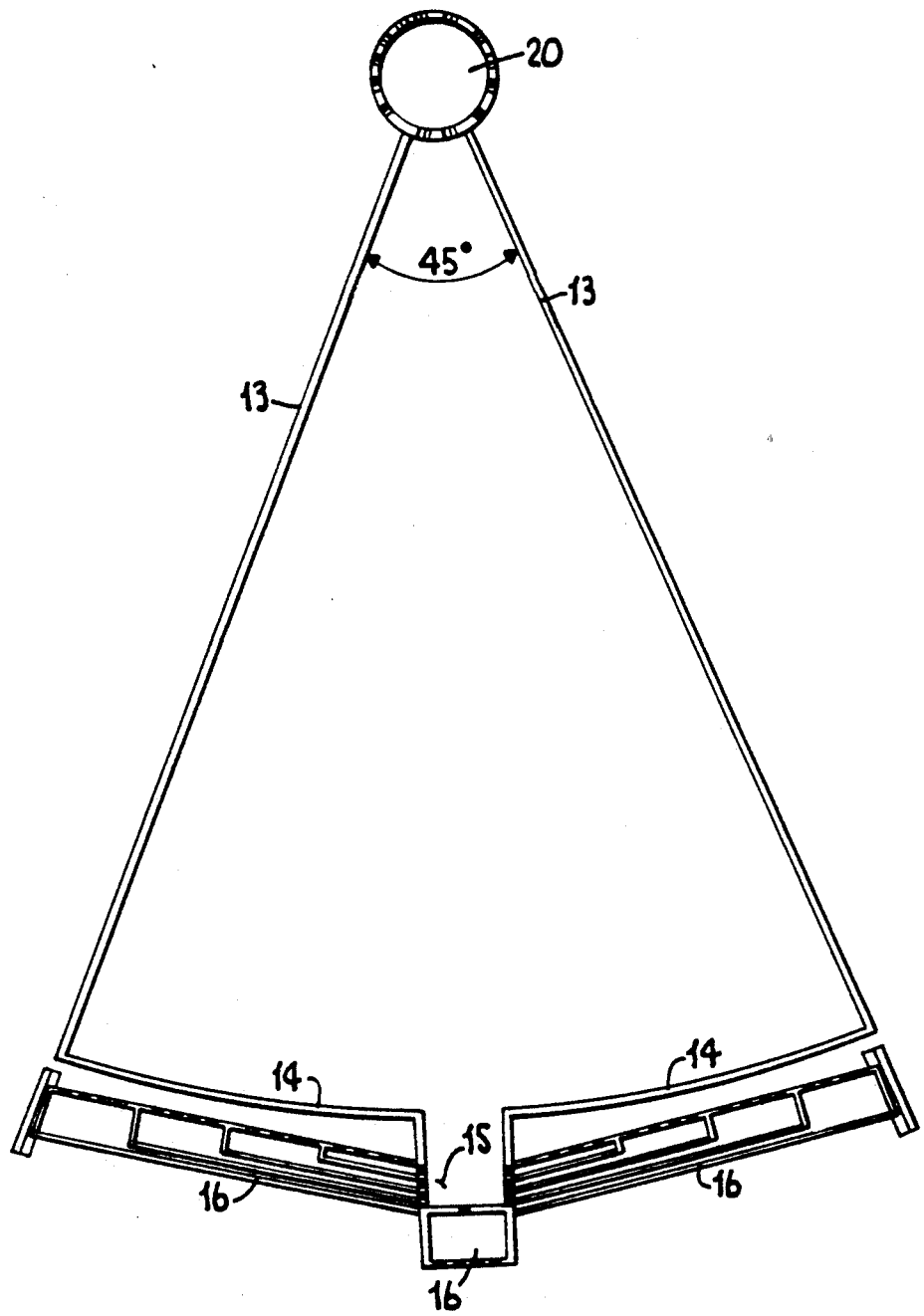
FIG. 2 is a top view of a portion of the dome of the steel containment vessel showing the general arrangement of the various elements and components used in the cooling water distribution system of this invention.

In FIG. 2, there is illustrated a preferred embodiment of the arrangement for distributing the cooling water onto the curved surface of dome top 4 of the steel containment vessel 1. The cooling water is introduced from the storage tank 9 by pipes which discharge into a slotted distributor cylinder 20 positioned at the center of the dome top 4. The slots in the distributor 20 are sized so that the flow from each slot will be substantially uniform even if the distributor 20 is tilted or misaligned. As shown in FIG. 2, a plurality of steel guide elements 13 are welded to the curved surface of the dome top 4 and extend radially outwardly and downwardly from the central distributor cylinder 20, thereby forming eight pie-shaped segments or sections on the dome top 4.

A plurality of circumferential collector elements 14 in the form of steel plates are welded to outer surface 5 of the dome top 4 part way down from the top of the dome 4. The collector elements 14 extend the whole way around the dome 4 and intersect the radial guide elements 13. A collector box 15 is positioned between a pair of adjacent radial guide elements 13 and a pair of adjacent circumferential collector elements 14 to receive the cooling water that has flowed over the dome top 4 between the radial guide elements 13 and then collected by the circumferential collector elements 14 and directed into the collector box 15. As the cooling water flows into the collector boxes 15, it is then redistributed out of the collector box 15 into a plurality of distribution channels 16 extending along and on either side of the collector box 15 and secured to the curved outer surface 5 of the steel containment vessel 1.

Figure 3:
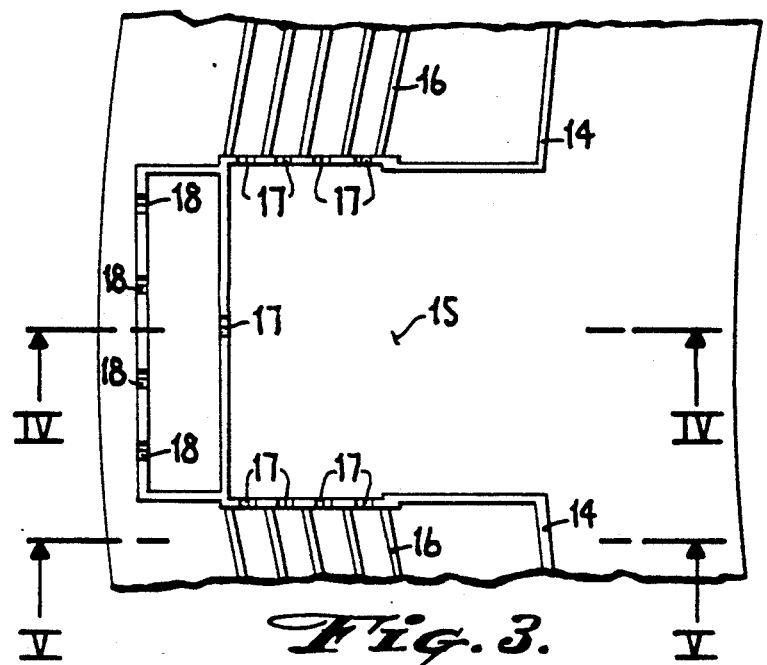
FIG. 3 is an enlarged top view of one of the collector boxes used in the cooling water distribution system of this invention.
Figure 4:
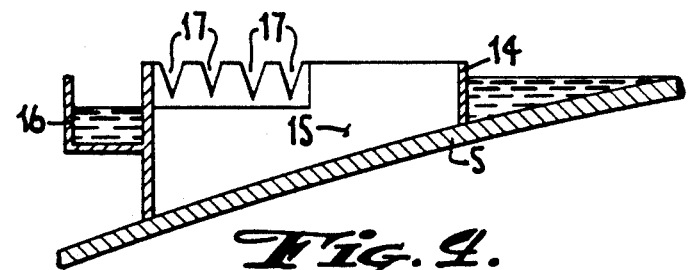
FIG. 4 is a sectional view taken along section lines IV—IV shown in FIG. 3.
Figure 5:
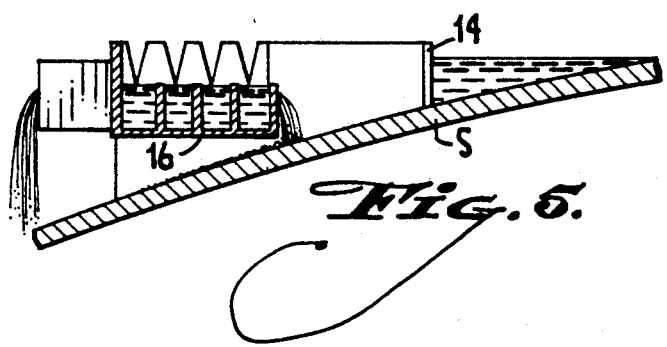
FIG. 5 is a sectional view taken along section lines V—V shown in FIG. 3.
Figure 6:
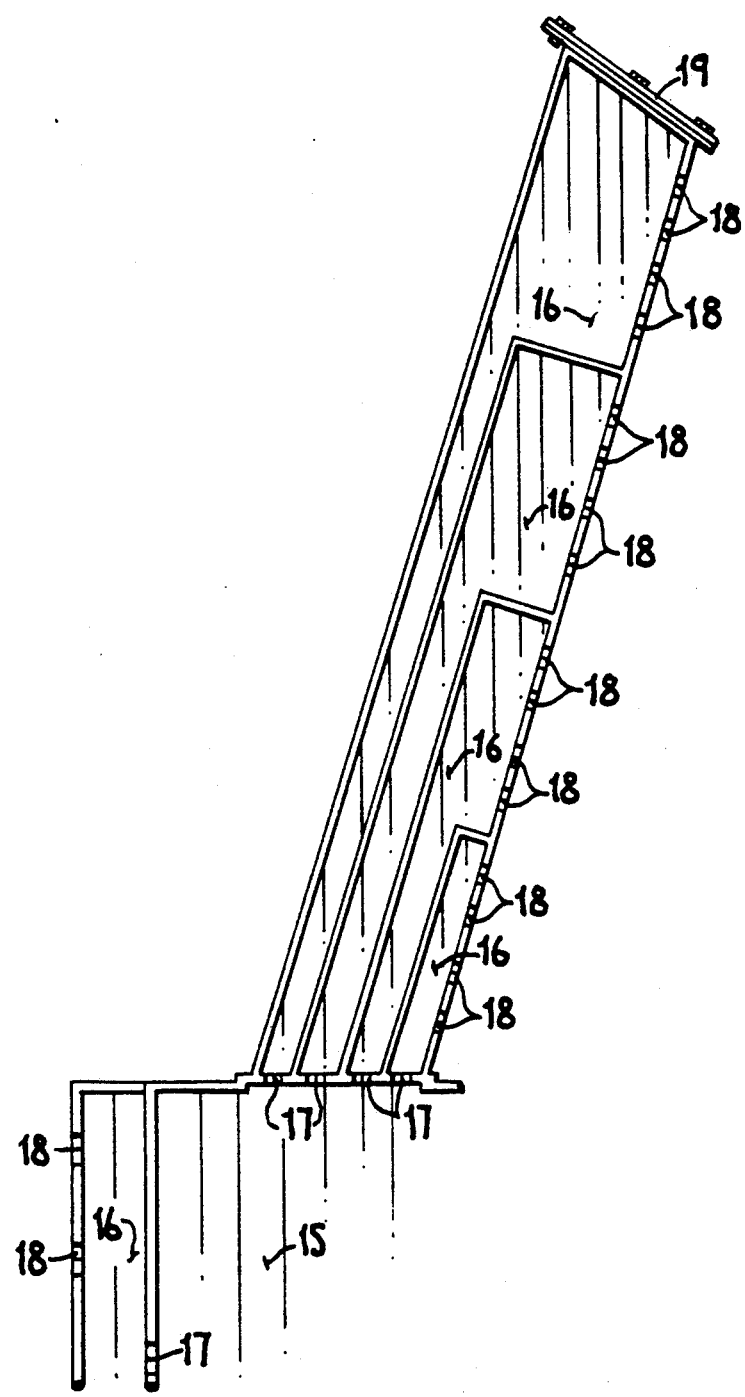
FIG. 6 is a top plan view showing the arrangement of the distribution channels used in the cooling water distribution system of this invention.

As shown in FIGS. 2, 3 and 4, the distribution channels 16 comprise four parallel channels of increasing length attached to each side of the collector box 15. The four parallel channels 16 on each side of the collector box 15 are grouped into a single fabricated element attached at one end to the collector box 15 and supported on the containment vessel at the other end. The distribution channels 16 are preferably built in a unit of four for each side of the collector box 15 but are secured to the outer surface 5 by brackets 19 that permit their adjustment in the field to provide sufficient slope to insure a continuous, uniform flow of cooling water in each distribution channel 16. The support onto the containment vessel 1 permits growth of the containment vessel 1 due to pressurization or differential temperature without overstressing the distribution channels 16. A single distribution channel 16 is attached to the front wall of the collector box 15 as shown in FIG. 3. The cooling water is introduced into all of the distribution channels 16 from the collector box 15 by a series of V-shaped weirs 17 cut into the walls of the collector box 15. This arrangement provides a uniform flow of cooling water into each of the distribution channels 16. One sidewall of each distribution channel 16 is provided with a plurality of V-shaped weirs 18 which are equally spaced from each other and distribute the cooling water contained in the distribution channels 16 onto the curved outer surface 5 of the steel containment vessel 1 just below the circumferential collector elements 14.

The arrangement of radial guide elements 13, circumferential collector elements 14, collector boxes and distribution channels is then repeated further and further down the curved surface 5 of the steel containment vessel 1 to provide a uniform, thin film coverage of the cooling water all over the surface 5 of the steel containment vessel 1. The V-shaped weirs 18 in the side wall of the distribution channels 16 discharge the nappe in an upward direction thereby maximizing the coverage of the outer surface 5. The weirs 17 in the collection boxes 15 are preferably bolted to the collection box 15 to allow final alignment and equal distribution of the water to the distribution channels 16. While I have preferred to use V-shaped weirs 17 and 18 to control the flow of the cooling water, weirs of another shape could also be used if desired.

While I have shown this invention by illustrating and describing the preferred embodiment of it, I have done this by way of example, and am not to be limited thereby as there are modifications and adaptions that could be made within the teachings of this invention.

I claim

1. Apparatus for distributing cooling water on the curved surface of a containment vessel comprising:
   (a) a source of cooling water,
   (b) a plurality of guide elements secured to said curved surface and extending radially outwardly and downwardly from said source of cooling water,
   (c) a plurality of circumferential collector elements secured to said curved surface and intersecting said radial guide elements,
   (d) a plurality of collector boxes, each box positioned between a pair of adjacent radial guide elements and a pair of adjacent circumferential collector elements,
   (e) a plurality of distribution channels extending along and on either side of each said collector box and secured to said curved surface,
   (f) a plurality of weirs in at least one sidewall of said distribution channels to distribute cooling water contained in said distribution channels onto said curved surface.

2. The apparatus of claim 1 in which the source of cooling water is a slotted distribution cylinder above said curved surface.

3. The apparatus of claim 1 in which the guide elements are eight in number.

4. The apparatus of claim 1 in which the collector boxes are eight in number.

5. The apparatus of claim 1 in which the sidewalls of the collector boxes are provided with weirs to distribute water into said distribution channels.

6. The apparatus of claim 5 in which the weirs are adjustable.

7. The apparatus of claim 1 in which four weirs are provided in each said distribution channel.

8. The apparatus of claim 1 in which the weirs are V-shaped.

9. The apparatus of claim 1 in which the distribution channels are adjustable relative to said curved surface.

* * * * *